US009095807B2

(12) United States Patent
Ackermann et al.

(10) Patent No.: US 9,095,807 B2
(45) Date of Patent: *Aug. 4, 2015

(54) CENTRIFUGAL SEPARATOR AND METHOD FOR PRODUCING A CENTRIFUGAL SEPARATOR

(71) Applicant: MANN+HUMMEL GMBH, Ludwigsburg (DE)

(72) Inventors: Steffan Ackermann, Otterstadt (DE); Karlheinz Muenkel, Oberderdingen-Flehingen (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/914,992

(22) Filed: Jun. 11, 2013

(65) Prior Publication Data
US 2013/0327002 A1 Dec. 12, 2013

(30) Foreign Application Priority Data
Jun. 11, 2012 (DE) .......... 10 2012 011 358

(51) Int. Cl.
B01D 45/12 (2006.01)
B01D 50/00 (2006.01)
B01D 45/16 (2006.01)
F01N 3/037 (2006.01)
F01N 13/18 (2010.01)

(52) U.S. Cl.
CPC .............. B01D 50/002 (2013.01); B01D 45/16 (2013.01); F01N 3/037 (2013.01); F01N 13/1861 (2013.01)

(58) Field of Classification Search
CPC ...... B01D 45/16; B01D 45/12; A47L 9/1641; A47L 9/1683; B04C 5/04
USPC .............. 55/456–457, 345–349, 396; 95/271
See application file for complete search history.

(56) References Cited

U.S. PATENT DOCUMENTS

| 2006/0130445 | A1* | 6/2006 | Park et al. ................ 55/346 |
| 2008/0209869 | A1* | 9/2008 | Rother et al. ............. 55/337 |
| 2010/0267540 | A1* | 10/2010 | Babb et al. ............... 494/59 |
| 2011/0108014 | A1 | 5/2011 | Schleiden et al. |

FOREIGN PATENT DOCUMENTS

DE    202008006719 U1    9/2009

* cited by examiner

Primary Examiner — Dung H Bui
(74) Attorney, Agent, or Firm — James Hasselbeck

(57) ABSTRACT

A centrifugal separator for separating particles from a fluid has a housing with a structural element provided with an opening. A cyclone cell having an inflow opening and an outflow opening is provided and is adapted to produce a swirl in a fluid that is flowing in through the inflow opening and exits through the outflow opening. The cyclone cell is secured in the opening of the structural element by being form-fittingly embedded by injection molding in the structural element. In a method for producing the centrifugal separator, at least one cyclone cell is provided and is embedded by injection molding so as to form the structural element that secures at least one cyclone cell in the housing.

8 Claims, 4 Drawing Sheets

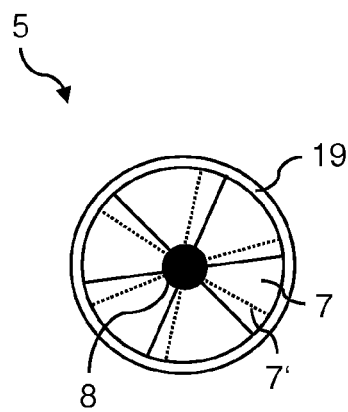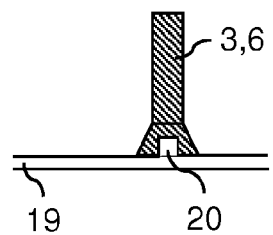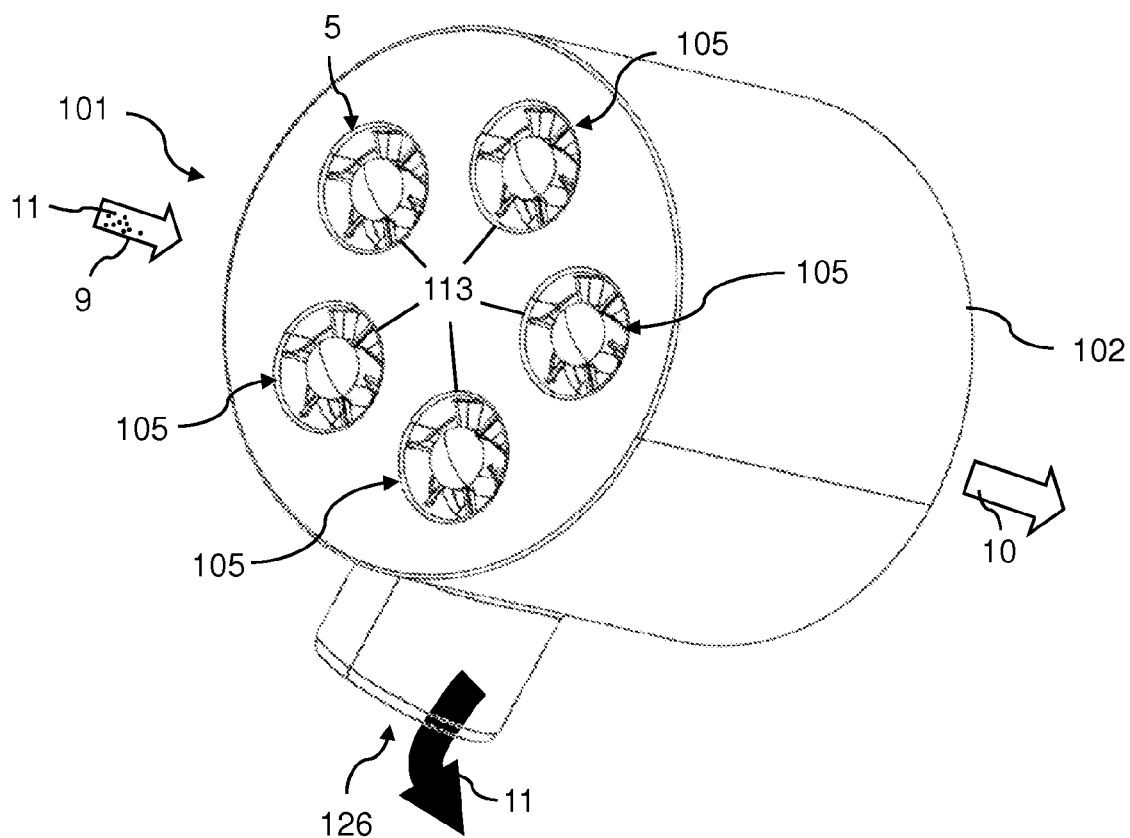
Fig. 7
Fig. 8
Fig. 9

CENTRIFUGAL SEPARATOR AND METHOD FOR PRODUCING A CENTRIFUGAL SEPARATOR

CROSS REFERENCE TO RELATED APPLICATIONS

This application claims the benefit under 35 USC 119 of the filing date of foreign application DE 10 2012 011 358.7 filed in Germany on Jun. 11, 2012, the disclosure of which is incorporated by reference to the fullest extent permitted by law.

BACKGROUND OF THE INVENTION

The invention concerns a centrifugal separator and a filter arrangement as it is used e.g. for filtering combustion air of an internal combustion engine. Moreover, a manufacturing process for centrifugal separators is disclosed.

Centrifugal separators, also named cyclone filters, cyclones or cyclone separators, serve for separating solid or liquid particles contained in fluids from the fluid. A fluid flowing into a centrifugal separator is guided such that centrifugal forces accelerate the particles that are to be separated from the fluid in a preferential direction so that the particles can be collected within the separator. For producing the centrifugal forces, guide vanes are usually used to generate a swirl within the separator housing.

Centrifugal separators can be used, for example, as air filters for combustion air for internal combustion engines. In particular in case of dust-laden environments in which in particular agricultural machines or construction machinery is used, cyclone filters or centrifugal separators have been proven to be suitable.

In order to increase the degree of separation of the dirt particles from air or fluid, multi-stage filter arrangements have been proposed also in the past. Downstream of a cyclone prefiltration, a further purifying filtering action by conventional filter media can be performed, for example. However, this entails increased manufacturing expenditure and additional limitations with regard to the installation situation of a corresponding filter arrangement. The throughput of appropriate centrifugal separators is increased, for example, in that several smaller separators are arranged in parallel inside a housing. In this connection, the individual premanufactured separating units should be attached fluid-tightly in or on the corresponding housing; this can lead to increased costs, particularly in case of mass-produced articles. Therefore, it is desirable to reduce in particular the manufacturing expenditure in case of air filters for internal combustion engines.

SUMMARY OF THE INVENTION

It is therefore an object of the present invention to provide an improved centrifugal separator.

Accordingly, a centrifugal separator for separating particles from a fluid is proposed. The centrifugal separator comprises a housing which has a structural element with an opening for securing a cyclone cell therein. The cyclone cell is adapted to generate a swirl in a fluid that is flowing in through an inflow opening; the cyclone cell is embedded by injection molding in the structural element with form fit.

The structural element which can be, for example, part of the housing is in particular manufactured from an injection-moldable material so that the cyclone cell is fixedly and preferably fluid-tightly connected to the housing. A corresponding centrifugal separator can be produced easily because in particular the housing with the structural element can be manufactured by means of a simple, for example, two-part, injection molding tool. The cyclones cells having complex geometries, for example, including undercuts, are advantageously produced beforehand. Accordingly, simple open-closed tools can be used for the manufacture of the centrifugal separator. By the form fit securing action of the cyclone cells by means of embedding by injection-molding in the housing material or structural element material, complex fastening mechanisms are not required. It is also possible to manufacture the cyclone cell and the housing from different materials. In comparison to conventional centrifugal separators that may also encompass multi-cyclones, the cyclone cells are not mounted in the housing but embedded by injection molding in the manufacturing process.

Centrifugal separators in the meaning of the present invention are to be understood in the following to include also cyclones, cyclone separators, cyclone filters or cyclone dust catchers. The proposed centrifugal separator is in particular embodied as an axial cyclone wherein the housing or the cyclone cell wall, for example, is embodied as a tubular or sleeve-shaped element and fluid to be filtered is flowing substantially along a longitudinal or symmetry axis through the separator. The particles to be separated are accelerated radially by the generated swirl in the direction toward the outer housing wall and can be removed thereat. An individual cyclone cell can also be considered to be a simple centrifugal separator.

In embodiments of the centrifugal separator, the cyclone cell has overlapping guide vanes. In particular, the guide vanes can overlap each other within a cross-sectional surface area perpendicular to an inflow direction. Such guide vanes that are serving to cause swirling and thus generate a centrifugal force on the particles contained in the fluid can be employed flexibly in the proposed centrifugal separator.

In embodiments of the centrifugal separator, the guide vanes extend between an axial core and a housing wall of the cyclone cell. The core extends, for example, in co-linear alignment with a longitudinal or symmetry axis of the cyclone cell. The cell wall can be designed to be sleeve-shaped or tubular, in particular across sections thereof. The axial core has then in general a predetermined diameter. A length of the resulting guide vanes is then defined by the diameter of the core as well as the inner housing diameter.

In embodiments of the centrifugal separator with a sleeve-shaped or tubular housing, the guide vanes and the axial core form a cylindrical guide vane apparatus which is inserted into the cyclone cell wall. The cyclone element is in particular a monolithic material component. Also, the housing can be a monolithic material component.

The cyclone cell wall comprises in this connection preferably at least sectionwise a projection or a recess. Such a projection, e.g. a bead, on an outer surface of the cell wall enables an improved form fit connection with the surrounding injection-molded housing material. It is also conceivable to provide the surface of the cell wall with further structures, for example, depressions, flutes, grooves, or pins in order to provide an improved securing action in the housing or structural element.

The guide vanes are in general stationarily arranged. However, conceivable are also rotatable or movable guide vanes in order to produce a turbulent flow or a swirled flow in an expedient way.

Optionally, the centrifugal separator can comprises an immersion tube that is provided in the housing and extends from the outflow opening in the direction toward the inflow opening. The immersion tube can be designed to be tubular or sleeve-shaped. Preferably, the immersion tube is formed with a cross-section that tapers in the direction toward the inflow opening of the cyclone cell.

In particular, a combination of an immersion tube that tapers conically in the direction toward the inflow opening with a conically designed housing section in the area of the immersion tube or the outflow opening leads to particularly beneficial flow conditions and degrees of separation of the centrifugal separator.

In preferred embodiments of the centrifugal separator, the immersion tube is mounted at the outflow opening by means of an immersion tube plate as a further structural element of the housing. The immersion tube plate closes off, for example, the outflow opening of the housing together with the immersion tube. The immersion tube plate is then, for example, embodied as a circular ring with an outer diameter that corresponds to the outflow opening and with an inner diameter that corresponds to an edge of the immersion tube.

The centrifugal separator is moreover provided in some embodiments with a particle discharge opening. The particle discharge opening opens preferably relative to a longitudinal axis of the cyclone element across a predetermined angular section in the housing wall. Moreover, the particle discharge opening has a discharge opening or discharge port depth. The depth is, for example, measured along the longitudinal axis.

Moreover, a centrifugal separator is proposed that is embodied as a filter device. The filter device comprises several cyclone elements or cyclone cells with one or several features as described above. The cyclone elements are provided in a housing of the filter device which comprises several openings as inflow openings for the centrifugal separator and comprises an outflow section that is fluid-tightly separated from the openings. The cyclone elements are enclosed or embedded by injection molding with form fit by the material of the housing. The outlet openings of the cyclone elements are communicating with the outflow section. Accordingly, several cyclone elements for cleaning combustion air for internal combustion engines can be arranged in parallel, for example. By means of the arrangement of the cyclone elements with parallel flow direction, the degree of separation as well as pressure loss upon passage of fluid through the filter device can be adjusted.

Moreover, a method for producing a centrifugal separator according to one of the preceding embodiments is proposed. The method comprises: providing one or several cyclone cells; and embedding by injection molding the one or several cyclone cells for forming a structural element for securing the one or several cyclone cells.

Preferably, the structural element is injection molded as a part of a filter housing by an injection molding process.

The method can be implemented with little expenditure because, for example, the cyclone elements can be provided as a bulk commodity or drop parts. They can be positioned in an injection molding process in an appropriate injection molding tool and are then embedded by injection molding for forming the housing.

Simple injection molding tools can be employed in this context. As a material, plastic materials such as polyamide (PA), polyester (PE), polypropylene (PP), thermoplastic elastomers (TPE), also on the basis of olefin (TPO), elastothane and/or polyolefins are suitable. It is in particular possible to manufacture the cyclone elements of an inexpensive and flexible material and to manufacture the housing of a stronger, mechanically stiffer material. Accordingly, high quality material can be saved. Moreover, the material of the structural element can be adjusted in order to dampen vibrations that are generated as a result of swirling at the cyclone elements.

Further possible implementations of the invention comprise also combinations, not explicitly mentioned, of features of the embodiments or embodiment variants of the centrifugal separator or the filter device that have been discussed above or will be disclosed in the following. A person of skill in the art will also add or modify individual aspects as improvements or supplements to the respective basic form of the invention.

Further embodiments of the invention are the subject matter of the dependent claims as well as of the embodiments of the invention described in the following. In the following, the invention will be explained in more detail with the aid of embodiments with reference to the attached drawings.

BRIEF DESCRIPTION OF THE DRAWING

FIG. 7 is a schematic plan view of an embodiment of a cyclone cell.

FIG. 8 is a schematic section view of a detail of an embodiment of a centrifugal separator.

FIG. 9 is a perspective view of an embodiment of a filter device with centrifugal separators.

In the Figures, same reference characters identify same or functionally the same elements inasmuch as nothing to the contrary is mentioned.

DESCRIPTION OF THE PREFERRED EMBODIMENTS

Figure 1:
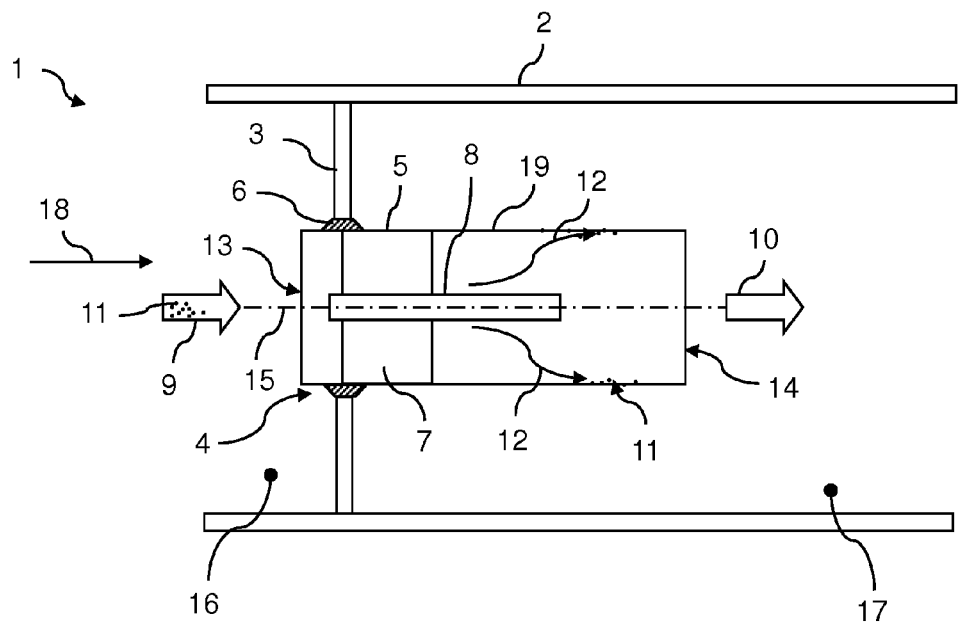
FIG. 1 shows a schematic longitudinal section of an embodiment of a centrifugal separator.

FIG. 1 shows a schematic longitudinal section view of an embodiment of a centrifugal separator.

In a centrifugal separator or cyclone separator, particles are removed or separated from a fluid laden with particles. In FIG. 1, this is indicated by an arrow 9 that represents flow of a raw fluid 9. The raw fluid 9, for example, air for an internal combustion engine, can contain dust or other particles 11. After passing through an appropriate centrifugal separator 1 that is embodied, for example, as an axial cyclone, purified air or fluid 10 flows out. The terms cyclone element and cyclone cell are used synonymously.

The centrifugal separator 1 has a housing 2 which comprises a structural element, for example, a partition 3. The partition 3 separates a raw fluid or raw air area 16 from a clean fluid or clean air area 17. In an opening 4 of the partition 3 a cyclone cell 5 is arranged. The cyclone cell 5 has a longitudinal axis 15 which in the embodiment of FIG. 1 also corresponds to a symmetry axis. The cyclone cell 5 is comprised of a cylinder-shaped cell wall 19, an axial core 8 and guide vanes 7 that extend between the core 8 and the inner side of cell wall 19. At the inflow side, an inflow opening 13 is provided and at the outflow side an outflow opening 14. In the cyclone cell 5, by means of the guide vanes 7 that form a guide apparatus a suitable flow guiding action is provided and thereby a swirl 12 is generated so that the particles 11 contained in the air are subjected to centrifugal forces. This means that the particles 11 are driven radially in outward direction in the direction toward the cylindrically shaped cell wall 19. Here, as indicated in FIG. 1, they can accumulate and can be removed.

For generating the swirl-shaped flow and thus radial forces acting on the particles 11, the guide apparatus is provided with suitable guide vanes 7. The guide vanes 7 can be wound, for example, in a screw shape or propeller shape about the axis 15 of the cyclone element 1. This is referred to also as axial cyclone. In the illustration of FIG. 1, a core 8 is provided along longitudinal axis 15 in a section in the vicinity of the inflow opening 13. The core 8 is secured by the guide vanes 7. The guide vanes 7 cause the swirl flow indicated by means of arrows 12. Particles or the fluid guided from the inflow opening 13 to the outflow opening 14 flow across the guide vanes 7. In this connection, the guide vanes may overlap in the direction of the inflow opening 18 and may form undercuts in the respective component.

In the illustration of FIG. 1, the material 6 of the structural element 3 surrounds tightly the shape of the cyclone element 5. In this context, it is possible to manufacture the structural element together with the housing 2 by an injection molding process. For this purpose, prestock cyclone elements 5 that have been produced separately are inserted into an injection molding tool and subsequently embedded by injection molding with the material of the structural element or housing. It is also possible to provide only the direct contact area between the structural element 3, or the opening 4 in the structural element 3, and the outer wall 19 of the cyclone cell with an injection moldable material. In this respect, as an alternative to a direct injection molding process and production of the housing 2, a housing form (housing blank) 2 can be premanufactured into which cyclone elements 5 are then inserted at appropriate positions and subsequently embedded by injection molding in a material.

In FIGS. 2 to 6, illustrations of a filter arrangement with several cyclone elements embodied as centrifugal separators are shown. FIGS. 2 through 6 serve moreover for explaining a manufacturing process for an appropriate filter arrangement or a centrifugal separator.

Figure 2:
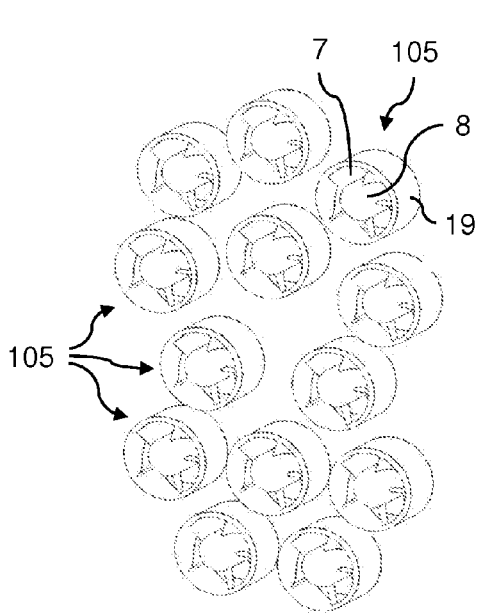
FIG. 2 shows in a perspective view an embodiment of the cyclone cells.

In a first step that is illustrated in FIG. 2, for example, the produced cyclone elements 5, 105 as drop parts are provided. The cyclone elements 5 each have a cyclone cell wall 19, a central core 8, and guide vanes 7 that are extending between the central core 8 and the inner side of the cyclone cell wall 19. This results in a substantially cylindrical geometry of the cyclone cells 5, 105. The cyclone cells are then inserted into the injection molding tool and are then embedded by injection molding in the material for the housing 2.

Figure 3:
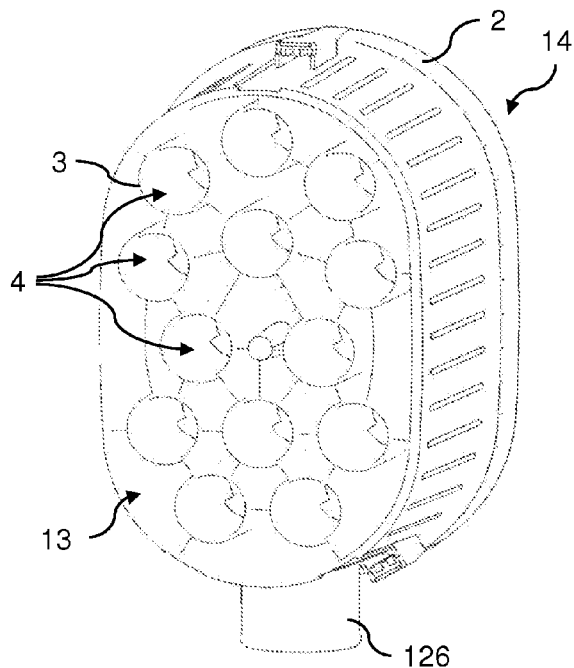
FIG. 3 is a perspective view of an embodiment of a housing form of a centrifugal separator.

FIG. 3 shows substantially the housing form 2 for which an appropriate injection molding tool is prepared. In the illustration of FIG. 3, the cyclone elements 5 are not inserted into openings 4 and not embedded by injection molding in the housing material. FIG. 3 shows thus a housing form (housing blank) 2 as well as, in the orientation of FIG. 3, at the front side an inflow side 13 and at the rear side an outflow side 14 for the purified fluid or air. In downward direction a dust discharge opening 126 is provided. In order to connect the cyclone elements 105 illustrated in FIG. 2 fluid-tightly and fast with the housing so as to produce a multi-cyclone arrangement, the cyclone elements 105 are embedded by injection molding in an injection molding process.

Figure 4:
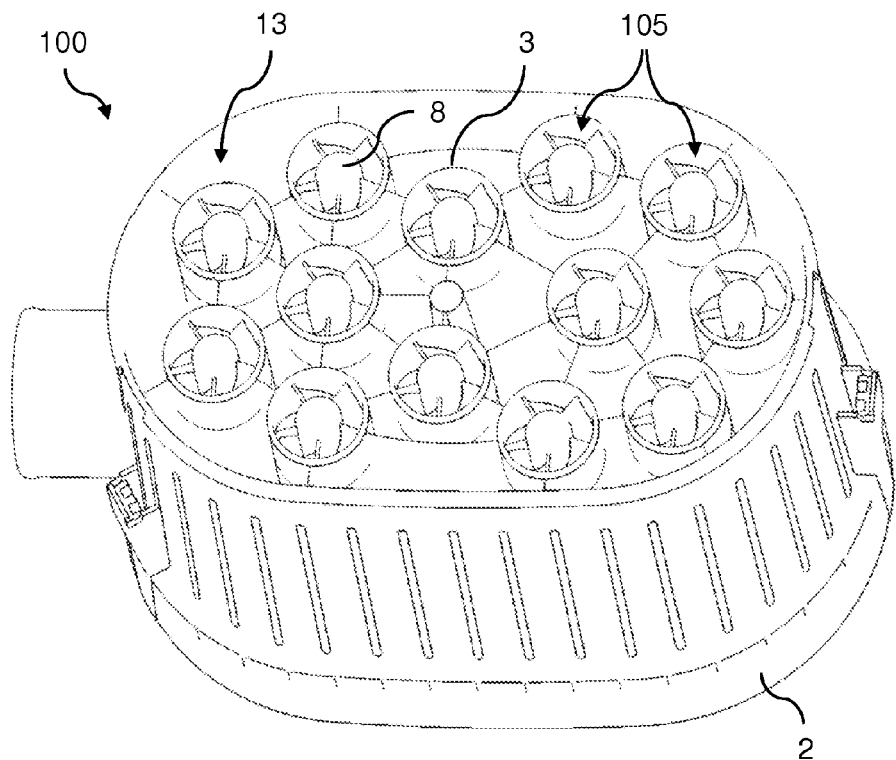
FIG. 4 is a perspective view of the embodiment of a centrifugal separator with the housing form of FIG. 3.

FIG. 4 shows the cyclone elements 105 as they are integrated in the housing 2 and fixedly secured in the openings 4 of the structural element 3 embodied as a securing section. By injection molding or embedding of the cylindrical cell walls 19, a form fit securing action of the cyclone elements 105 is provided.

Figure 5:
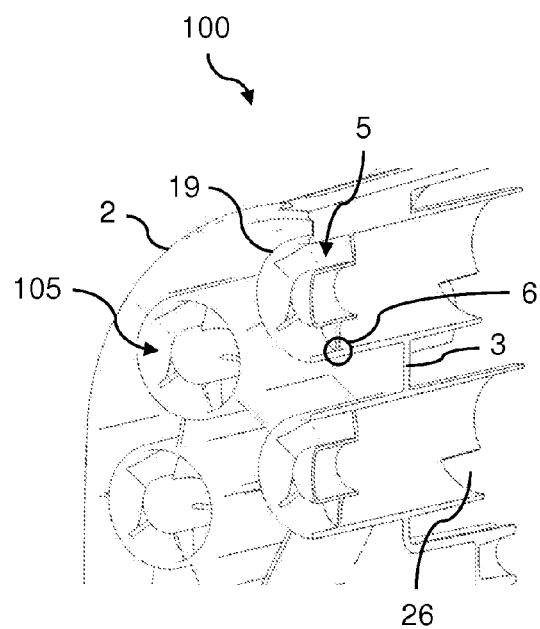
FIG. 5 is a perspective partial view of the embodiment of the centrifugal separator of FIG. 4.
Figure 6:
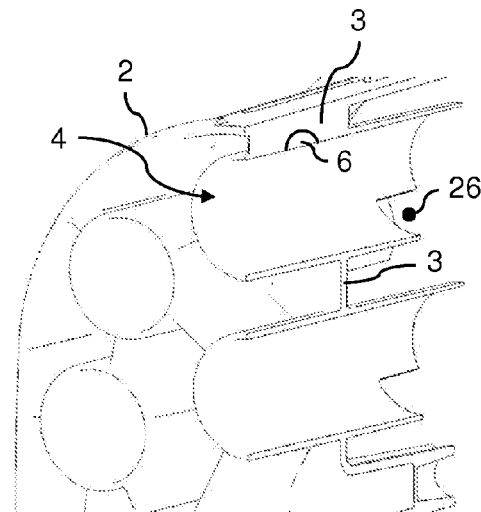
FIG. 6 is a perspective partial view of the embodiment of the housing form of FIG. 3.

In FIGS. 5 and 6, perspective partial section views are illustrated which correspond to the illustrations of FIGS. 4 and 3. In the section of FIG. 5, at the upper right corner a cyclone element 5, integrated into the securing plate 3, can be seen. In the area encircled by circle 6, the cyclone element 105 is embedded by injection molding with form fit by the material of the housing or the securing plate. A reliable securing action of the cyclone elements 5, 105 in the housing 2 is provided.

In FIG. 6, a detail of the housing form (housing blank) is illustrated. The cyclone elements are integrated into the openings 4 by injection molding. It is possible in a simple way to match the materials for the cyclone elements and/or the housing form. For example, plastic material or other injection-moldable materials can be used. In order to avoid a static charging of the housing and/or of the cyclone elements, conductive materials can be admixed. Therefore, a simple manufacturing process for multi-cyclone arrangements is provided as well as a flexibly adaptable filter arrangement with several cyclone elements. The employed injection molding tools can be produced in a simple way and are preferably simple open-closed tools. In comparison to methods in which the cyclone elements are also produced by an injection molding process together with the housing form, the proposed manufacturing process and the centrifugal separators have the advantage that even complex centrifugal separator geometries can be achieved with little expenditure.

In FIG. 7, a cross-sectional view of a cyclone cell 5 is illustrated, for example. The illustration of FIG. 7, shows a view of the inflow opening along the longitudinal axis 15 (see FIG. 1). Six guide vanes 7 are provided that extend between the axial core 8 and the cell wall 19. The dashed lines 7' indicate that the guide vanes overlap at least partially. The dashed lines are thus trailing edges of the guide vanes that are positioned behind the leading edges of the leading guide vanes 7 that are oriented forwardly. Such guide vane geometries require undercuts and complex movable injection molding tools. In the proposed method, these cyclone cells 5 can be simply premanufactured and the premanufactured parts can then be used in the manufacture of the housing or in finalizing the filter arrangement.

FIG. 8 shows a schematic section view of a detail of an embodiment of a centrifugal separator. In particular the transition between the housing and the cell wall is illustrated. The cell wall 19 of a cyclone element that is not illustrated in detail in this context has for example a cylindrical surface. On the outer cylinder wall a bead or projection 20 is provided. By means of the projection, the material of the housing or of a structural element 3, 6 can be molded with form fit about the projection 20 in the injection molding process. It this way, a particularly reliable securing action results. Conceivable are however also other elements that break up rotational symmetry relative to the longitudinal axis. For example, annular grooves or beads are conceivable. It is also possible to provide the housing wall with recesses into which the injection molding material penetrates in order to provide form fit.

Figure 10:
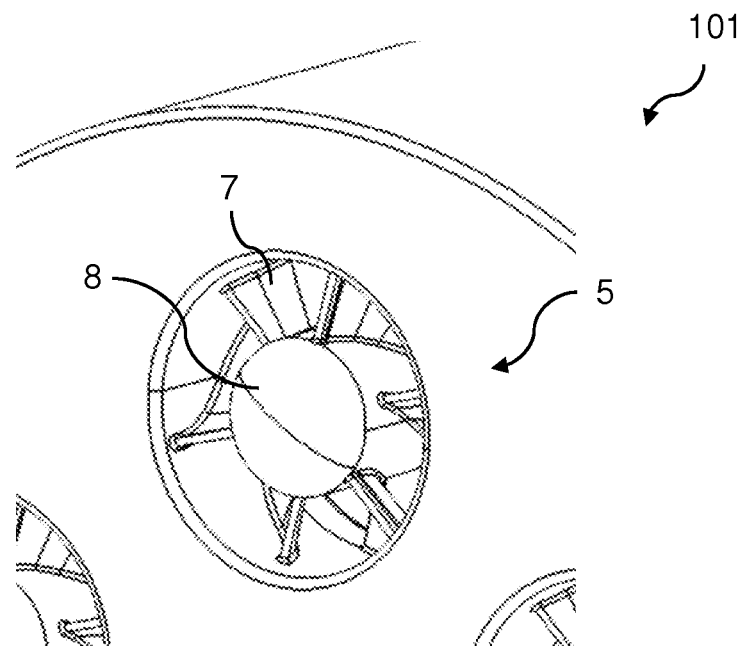
FIG. 10 is a detail view of a section of the embodiment of the filter device with centrifugal separator.
Figure 11:
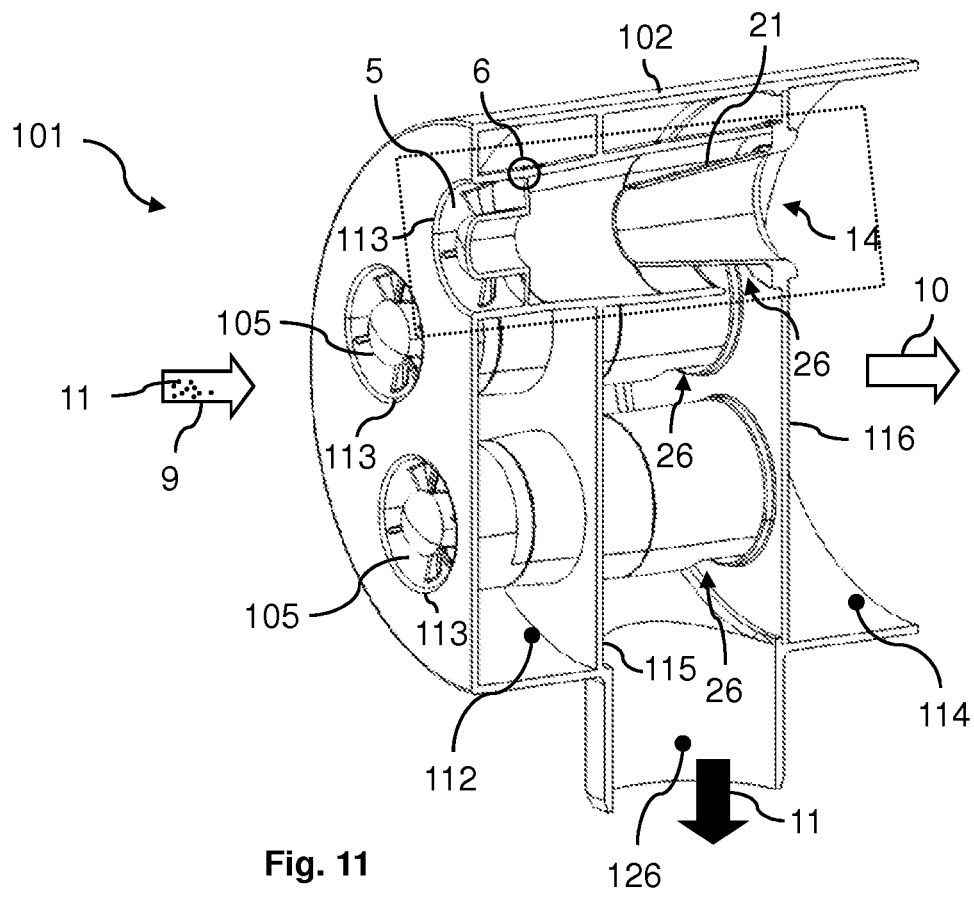
FIG. 11 shows a section view of the embodiment of a filter device with centrifugal separator.

Several centrifugal separators according to the preceding embodiments of FIGS. 1, 2, and 7 can be combined in a common housing to form a filter device. In FIGS. 9 through 11, further embodiments of a filter device with centrifugal separators or cyclone cells are illustrated. FIG. 9 shows a perspective view of an embodiment, FIG. 10 a detail view of a centrifugal separator inserted therein and embedded by injection molding in the housing material, and FIG. 11 shows a cross-sectional view of an embodiment of a filter device.

A filter device 101 has in this connection a housing 102 in which several cyclone cells 5, 105 are integrated. In the orientation of FIGS. 9 to 11, inflow of the raw fluid 9 which is laden with particles takes place from the left. The clean fluid 10 exits to the right. In the downward direction, indicated by the black arrow 11, separated particles can be discharged. In the housing 102 several openings 113 are provided into which are fitted the inflow openings 13 of the cyclone elements 5, 105 that are secured with form fit by the housing material 6. A particle discharge opening 126 extends in downward direction away from the housing 102. In the detail view of FIG. 10, one can see that the inserted cyclone elements 5, 105 comprise a central core 8 and are provided with six guide vanes 7.

In the cross-sectional view of FIG. 11, a centrifugal separator (dotted rectangular area) is indicated in cross-section. The filter device 101 has substantially three areas. A structural element 112 of the housing 100 embodied as a securing section supports or secures the cyclone elements 5, 105 by form fit. This is achieved by embedding by injection molding the cyclone cell walls in the housing material in an injection molding process. The outflow openings 14 of the cyclone elements 5, 105 communicate with a common discharge section 114. The outflow section 114 is separated from a discharge section 126. The cyclone elements 5, 105 are provided with particle discharge ports 26 that are communicating with the discharge section 126. At the inflow side, contaminated fluid, for example, combustion air, enters through the openings 113 into the cyclone elements 5, 105, flow through the cyclone elements 5, 105 which transfer the particles to the particle discharge ports 26, and purified air exits into the outflow section 114 through the outflow openings 14. The purified air 10 can then be passed to an internal combustion engine, for example. The orientation of the discharge ports 26 relative to the earth's gravity, which in the orientation of FIG. 11 is pointing downwardly, is identical. Accordingly, as a result of the force of gravity, the particles fall in downward direction through the discharge section 126 and can be discharged. The parallel arrangement of cyclone elements 5, 105 enables an adaptation of the resulting pressure losses as well as of the degrees of separation.

An appropriate filter device 101 obtains an even better filter action when at the discharge section 126 a reduced pressure exists relative to the pressure at the inflow openings 113. For example, the discharge section designed as a suction socket can be connected to a suction device that catches and discharges the dust.

Even though the present invention has been explained with various examples and aspects of the centrifugal separators, it is not limited thereto but can be modified in many ways. In particular, the various aspects that have been disclosed in connection with the drawings and the embodiments can be combined with each other.

The materials of the cyclone elements, housing and structural elements can be matched to the respective fields of application. In particular, injection moldable plastic materials are conceivable.

While specific embodiments of the invention have been shown and described in detail to illustrate the inventive principles, it will be understood that the invention may be embodied otherwise without departing from such principles.

What is claimed is:

1. A centrifugal separator for separating particles from a fluid, the centrifugal separator comprising:
    an axially extending housing having a central axis and a structural element, the housing having a raw air side at a first axial end and a clean air side at an opposing axial end, the housing circumferentially surrounding an interior space arranged within the housing;
    wherein the structural element is a partition extending in a traverse direction relative to the central axis, the partition extending fully across and closing over the interior space, a radially inner side of the housing closing onto the partition at its periphery, separating the raw air side from the clean air side of the housing;
    wherein the partition is formed together with the housing as a unitary one-piece component of the housing;
    wherein the partition has an opening extending axially through the partition;
    wherein the partition forms a tubular member having a tubular outer wall with an open interior, the tubular member extending axially through the partition opening, the tubular member having an inflow opening and an outflow opening arrange at opposing axial ends of the tubular member, the tubular member having a discharge port extending radially through the tubular outer wall;
    a cyclone cell formed as a drop part component separate from the partition and housing, the cyclone cell including:
        a tubular cyclone cell outer wall;
        an axially extending central core arranged within an interior of the tubular cyclone cell outer wall;
        guide vanes surrounding the central core and having a radially outer portion secured onto the tubular cyclone cell outer wall and a radially inner portion secured onto the axially extending central core;
    wherein a the tubular cyclone cell outer wall is arranged within the open interior of the tubular member of the partition, a radially outer surface of the tubular cyclone cell outer wall contacting and secured onto a radially inner surface of the tubular member of the partition;
    wherein the cyclone cell is adapted to produce a swirl in a fluid that is flowing in through the inflow opening and exits through the outflow opening;
    wherein the cyclone cell is form-fittingly embedded by injection molding into the structural element.

2. The centrifugal separator according to claim 1, wherein the cyclone cell guide vanes overlap each other.

3. The centrifugal separator according to claim 1, wherein the cyclone cell is comprised of a first material and the structural element is comprised of a second material, wherein the first material is different from the second material.

4. The centrifugal separator according to claim 1, wherein the cell wall has at least sectionwise a projection or a recess.

5. The centrifugal separator according to claim 1, wherein the housing has a raw fluid area and a clean fluid area, wherein the structural element separates the raw fluid area from the clean fluid area.

6. The centrifugal separator according to claim 1, comprising
    a plurality of said cyclone cells,
    wherein the structural element has a plurality of openings, each corresponding to a respective one of said plurality of the cyclone cells and
    said plurality of cyclone cells are form-fittingly secured into said several openings of the structural element as a unitary monolithic component of the structural element by being form-fittingly embedded by injection molding in a material of the structural element.

7. A method for producing a centrifugal separator according to claim 1, the method comprising:

providing a housing having a central axis and a partition, the housing having a raw air side at a first axial end and a clean air side at an opposing axial end, the housing circumferentially surrounding an interior space arranged within the housing;

wherein the partition extends in a traverse direction relative to the central axis, the partition extending fully across and closing over the interior space, wherein a radially inner side of the housing closes onto the partition at its radially outer periphery, separating the raw air side from the clean air side of the housing;

wherein the partition is formed together with the housing as a unitary one-piece component of the housing, the partition forming a tubular member having a tubular outer wall with an open interior, the tubular member extending axially through the partition opening, the tubular member having an inflow opening and an outflow opening arrange at opposing axial ends of the tubular member, the tubular member having a discharge port extending radially through the tubular outer wall;

providing at least one cyclone cell formed as a drop part component separate from the partition and housing, the cyclone cell including:
a tubular cyclone cell outer wall;
an axially extending central core arranged within an interior of the tubular cyclone cell outer wall; and
guide vanes surrounding the central core and having a radially outer portion secured onto the tubular cyclone cell outer wall and a radially inner portion secured onto the axially extending central core;

inserting the at least one cyclone cell into the open interior of the tubular member of the partition;

embedding by injection molding the at least one cyclone cell into the tubular member of the partition, securing a radially outer surface of the tubular cyclone cell outer wall onto a radially inner surface of the tubular member of the partition.

8. A centrifugal separator produced according to the method of claim 7.

* * * * *